United States Patent [19]

Wolf et al.

[11] Patent Number: 4,772,640

[45] Date of Patent: Sep. 20, 1988

[54] PROCESS FOR FOAMING POLYMERIC COMPOSITIONS WITH ORGANIC AZO COMPOUNDS AND COMPOSITIONS ASSOCIATED THEREWITH

[75] Inventors: Richard A. Wolf; Edwin J. Wilson; Philip J. Brondsema, all of Midland, Mich.

[73] Assignee: The Dow Chemical Company, Midland, Mich.

[21] Appl. No.: 142,033

[22] Filed: Jan. 11, 1988

Related U.S. Application Data

[62] Division of Ser. No. 84,667, Aug. 12, 1987, Pat. No. 4,743,623.

[51] Int. Cl.[4] ................................................ C08J 9/10
[52] U.S. Cl. ........................................ 521/90; 521/95; 521/180
[58] Field of Search ............................ 521/90, 95, 180

[56] References Cited

U.S. PATENT DOCUMENTS

3,993,609 11/1976 Kamens ............................... 521/140
4,029,615 6/1977 Kamens et al. ..................... 521/182
4,343,911 8/1982 Hoki et al. .

FOREIGN PATENT DOCUMENTS

0055716 11/1981 Japan .
0790312 2/1958 United Kingdom .

OTHER PUBLICATIONS

Hinz et al., "Zur Frage des Einstufigen oder Mehrstufigen Verlaufs der Azoalkanthermolyse," 22 *Tetrahedron Lett.*, 1975, 1977 (1973).

Kerber et al., "Der Ansynchone Zerfall einiger Arylazomalodinitrile," 170 *Makromol. Chemie*, 155,158 (1972).

Kerber et al., "Substitutenteneinflu auf die Kinetik des thermischen Zerfalls von unsymmetrischen Azonitrilen und Azodinitrilen," 164 *Makromol. Chemie*, 183 (1973).

Curtin et al., "Reaction of Organometallic Compounds with Diazonoium Salts. Synthesis of Arylazoalkanes," 21, *J. Org. Chem.*, 1221 (1956).

Curtin et al., "Reaction of Diarylzinc Reagents with Aryldiazonium Salts. Direct Formation of cis–Azo Compounds," 26, *J. Org. Chem.*, 1764 (1961).

O'Connor, "Tautomerism in Phenylhydrazones," 26, *J. Org. Chem.*, 4375 (1961).

Bellamy et al., "Studies on the Possible Interconversion of Phenylhydrazones and Phenylazoalkanes. Part I," 1965, *J. Chem. Soc. (London)*, 2788 (1965).

Fowler, "A New Synthesis of Unsymmetrical Azo Compounds," 37 *J. Am. Chem. Soc.*, 510 (1972).

Solomon et al., "Polar Factors in Radical Dissociations. Kinetics of Decomposition of meta-Substituted Phenylazotriphenylmethanes," 79, *J. Am. Chem. Soc.*, 4104 (1975).

*Primary Examiner*—Morton Foelak

[57] ABSTRACT

Azo compounds such as 2-ethyl-6-methyl-phenylazo-t-butane which contain an aromatic moiety bridged to one or more alkyl moieties by azo groups are useful blowing agents in a novel process for foaming compositions of polymers such as polycarbonates.

10 Claims, No Drawings

PROCESS FOR FOAMING POLYMERIC COMPOSITIONS WITH ORGANIC AZO COMPOUNDS AND COMPOSITIONS ASSOCIATED THEREWITH

CROSS-REFERENCE TO COPENDING APPLICATION

This application is a divisional application of copending application Ser. No. 84,667, filed Aug. 12, 1987, now U.S. Pat. No. 4,743,623.

BACKGROUND OF THE INVENTION

This invention relates to processes for foaming polymeric compositions and to foamed polymeric compositions.

Foamed polymeric compositions are cellular structures which are typically comprised of a gaseous compound dispersed throughout a solid. Such foamed compositions can exhibit a lower density and weight, but a substantially equivalent strength to non-foamed compositions. An example of a commercial foamed thermoplastic polymeric composition is a polycarbonate polymer foamed with 5-phenyl tetrazole compound.

Polycarbonate polymers are derived from reactions of dihydroxyorganic compounds. Commonly used polycarbonates are derived from dihydric phenols and carbonic acids such as phosgene. Such thermoplastic polymers are suitable for the manufacture of molded parts wherein impact strength, rigidity, toughness, heat resistance and excellent electrical properties are desired.

Thermoplastic polymeric compositions are foamed by incorporating a blowing or foaming agent into the polymeric composition at a temperature below the decomposition temperature of the blowing agent. The polymeric composition and blowing agent are then subjected to sufficient conditions to decompose the agent into gaseous products, for example by raising temperature, which can cause the volume of the polymeric composition to increase. Unfortunately, many blowing agents, including 5-phenyl tetrazole, decompose into products which adversely affect the polymeric composition. For example, the decomposition products of 5-phenyl tetrazole undesirably react with polycarbonate polymers, lowering the molecular weight, and causing brittleness in the final polycarbonate foam.

In view of the disadvantages of known methods, it would be desirable to have blowing agents, and/or a method of foaming polymeric compositions wherein the agents would be versatile for a variety of polymeric compositions, and would have degraded products which would not react with polymeric compositions.

SUMMARY OF THE INVENTION

One aspect of the instant invention is a process for foaming a thermoplastic polymer, wherein a foaming amount of blowing agent is mixed with thermosetting monomer or molten thermoplastic polymer and subsequently the mixture is heated to a temperature at which the blowing agent decomposes, the improvement comprising using as a blowing agent an azo compound with an aromatic moiety bridged to one or more aliphatic moieties by azo groups, said moieties being chosen such that the decomposition temperature of the azo compound is at least about 200° C. and is a temperature at which the polymer composition is liquid and stable.

Another aspect of the instant invention is a composition of matter useful in the practice of the instant process which comprises a thermoplastic polymer and as a blowing agent an azo compound having an aromatic moiety bridged to one or more aliphatic moieties by azo groups, said moieties being chosen so that the decomposition temperature of the blowing agent is above the melting point of the polymer and at least 200° C., but below the decomposition temperature of the polymer.

A third aspect of the instant invention is a foamed polymer composition comprising a thermoplastic polymer which has been foamed by the improved process of the instant invention.

The asymmetrical organic azo compounds are versatile and adaptable for many polymeric compositions. The properties and particularly the decomposition temperature of the azo compound can be changed by changing the organic substituents. The decomposition products of the azo compounds are substantially inert toward the polymeric composition because they are primarily nitrogen and organic gases.

DETAILED DESCRIPTION OF THE INVENTION

The Blowing Agents

The instant invention relies upon the decomposition of an aliphatic-aryl azo compound of the type herein described to foam a thermosetting or thermoplastic polymer in a liquid form. The foaming agents useful in the present invention are characterized by the presence of at least one azo group, i.e., —N=N—, in each molecule. Azo groups form a bridge between an aromatic moiety, which may contain substituents and hetero atoms, and one or more aliphatic moieties. Azo compounds useful in the present invention preferably have the general formula

Ar$\text{-}$(N=N—R)$_n$ wherein Ar is an aromatic or inertly substituted aromatic moiety; R is an aliphatic moiety; and n is 1, 2 or 3. More preferably, n is 1 or 2. Most preferably n is 1. If n is 2 or 3, then the azo groups are most preferably attached to the aromatic moiety at positions meta to one another.

Ar can be any substituted or unsubstituted aromatic moiety wherein the aromatic moiety is bonded directly to the nitrogen atom of the azo group. Preferably, Ar has the formula:

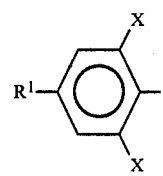

wherein R' and each X are independently hydrogen or a nonmetallic moiety with a formula weight of 15 or greater. Examples of X include alkyl groups such as methyl, ethyl and t-butyl; alkoxy groups such as methoxy and ethoxy; cyano; carboxylic acids and their derivatives; aldehyde groups; halogen atoms; thiols; amide groups; and the like. More preferably, each X and R' are independently hydrogen or alkyl. Most preferably, each X is hydrogen, methyl or ethyl and at least one X is methyl or ethyl. For example, Ar can include moieties such as:

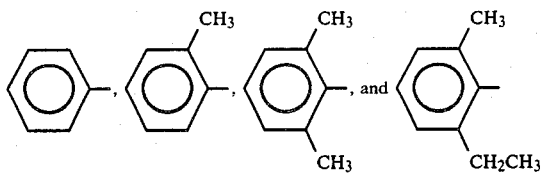

Ar may also be a heterocyclic moiety, preferably with no more than 5 carbon atoms, and/or a polycyclic moiety, preferably with no more than 18 carbon atoms. For example, Ar can be a pyridinyl, thiophenyl or furanyl aromatic group, with or without substituents X and R', as described hereinbefore. Ar may also be naphthalene, anthracene, phenanthrene, or acenaphthylene.

Substituents on the aryl moiety can affect the decomposition temperature of the azo compound. Generally, the azo compound decomposes at a lower temperature when one or more of the positions ortho to the azo group contains a non-metallic substituent with a formula weight in excess of 15, such as a methyl or ethyl group. That criterion can be met in polycyclic aromatic moieties by placing the azo group adjacent to a tertiary aryl carbon, for instance at the 2 position of naphthalene.

R may be any aliphatic moiety or inertly-substituted aliphatic moiety. For the purposes of this discussion, "inertly-substituted" means stable and inert with respect to all other components of the polymer under ordinary reaction and processing conditions. Preferably, R is a tertiary alkyl or inertly-substituted alkyl moiety. The exact form which is most preferred for R depends upon the properties which are desired from the blowing agent. Azo compounds with large tertiary alkyl groups in the R position, such as a tertiary pentyl, hexyl, heptyl or octyl moiety generally decompose at a slightly lower temperature than azo compounds with a t-butyl moiety in the R position. Most preferably, R has four to eight carbons.

Some examples of azo compounds which are useful in the practice of this invention are given below:

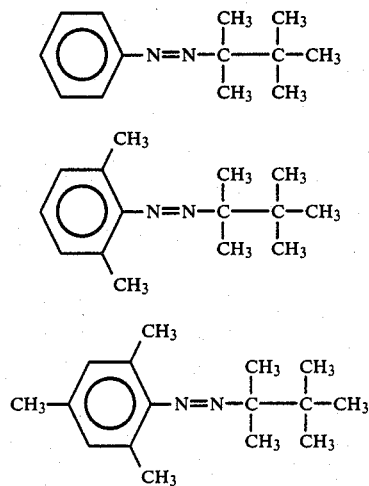

-continued

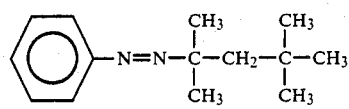

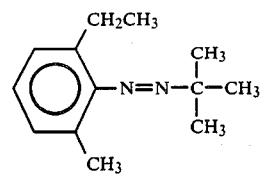

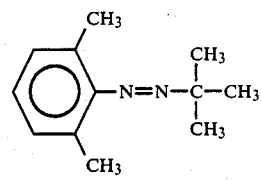

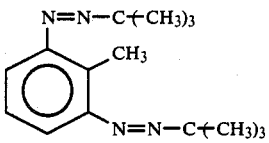

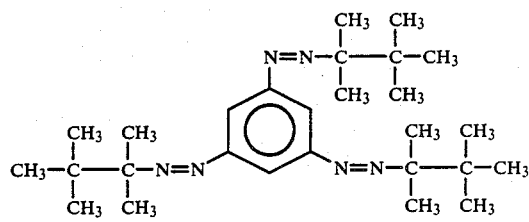

The azo compounds useful in this invention are either solids or liquids at ambient temperature and pressure. The structures are chosen so that the azo compounds will undergo thermally induced decomposition, to nitrogen and organic products at a temperature above 200° C., preferably above 240° C., and below 350° C., preferably below 315° C., at pressures ranging from atmospheric to 5000 psi.

Azo compounds useful in this invention are prepared by reacting a diazonium ion with an organometallic compound. A compound of the formula Ar—NH$_2$ can be converted to an ion such as Ar—N$_2^\oplus$ in the presence of a non-nucleophilic agent such as fluoroboric acid or antimony hexafluoride in order that the diazonium moiety not be displaced from the anion; and in the presence of an oxidizing agent such as sodium nitrite, which is capable of oxidizing the amine to a diazonium moiety. The conversion of the aromatic amine to the aromatic diazonium ion can be performed in the presence of a nucleophilic agent such as hydrochloric acid or hydrobromic acid under subambient conditions. The resulting diazonium ion is reacted with an organometallic compound. The organometallic compound is, for example, a compound of the formula R—ZnCl, R—MgCl, R—MgBr, R—MgI or R—ZnBr. Reaction conditions of the diazonium ion with the organometallic compound typically include subambient temperatures in order to maintain the temperature below the decomposition temperature of the diazonium ion, while the reactants are in a suitable anhydrous solvent such as diethylether, tetrahydrofuran, dioxane, hexane, pentane or ether/alkane mixtures. Isolation of the product is performed using techniques such as vacuum distillation or column chromatography.

Azo compounds useful in this invention are also prepared by contacting an isocyanate-substituted aromatic compound with a tertiary alkyl primary amine compound under conditions sufficient to provide an aryl/alkyl urea compound; and then oxidizing said urea compound in order to provide the desired azo compound. The procedure is described in Fowler, *A New Synthesis of Unsymmetrical Azo Compounds*, 37 J. Org. Chem. 510 (1972), which is incorporated herein by reference. Examples of suitable isocyanate-substituted aromatic compounds include phenyl isocyanate, o-toluyl isocyanate, 2,6-dimethylphenyl isocyanate, and toluene diisocyanate. Examples of tertiary alkyl primary amines include t-butylamine, t-pentylamine, triethylcarbinylamine and t-octylamine. Typically, the aforementioned isocyanate-substituted aromatic compound and tertiary alkyl primary compound are contacted under anhydrous conditions in the presence of a suitable solvent such as pentane, heptane, hexane, benzene, toluene, chloroform, carbon tetrachloride or methylene chloride. If desired, a catalyst or initiator such as a hindered tertiary amine can be employed. The resulting urea compound is contacted with the oxidizing agent such as sodium hypochlorite, t-butylhypochlorite, potassium perchlorate, sodium chlorite, calcium hypochlorite, or sodium hypobromite. Sufficient oxidizing agent is employed in order to oxidize the urea functionality to provide the desired azo functionality. Most preferably, the oxidation of the urea compound is performed in a basic environment. Isolation of the product is performed using techniques such as vacuum distillation or column chromatography.

The Process

Techniques to foam and shape a polymer using a thermally activated blowing agent are well known in the art of polymer chemistry. The primary improvement of the instant process over known processes is in the use of the blowing agents described above to foam the polymer.

First, the blowing agents described above are dispersed throughout the liquid polymer, oligomer or monomer under conditions at which the blowing agent is stable. Thereafter, the polymer composition is subjected to conditions which cause the azo compound to decompose liberating nitrogen gas, either in a forming apparatus or under pressure such that the released gases can not expand substantially. If the azo compound is decomposed under pressure, the composition is subsequently injected into a forming apparatus under conditions which allow the gas bubbles formed by the blowing agent to expand. Once the composition is in the forming apparatus it is hardened, for example by cooling if it is a thermoplastic polymer or by curing if it is a monomer or oligomer composition.

Polymeric compositions useful in this invention are termoplastic and thermosetting monomers, oligomers and polymers which are liquids or can be melted to form a liquid at temperatures below the azo compounds' decomposition temperatures and are substantially stable at the azo compounds' decomposition temperature and can be rapidly hardened after decomposition of the azo compound to form a solid composition. Examples of suitable thermosetting polymeric compositions include epoxy resins, polyimide resins, polycyanate resins, benzocyclobutene resins, and the like. Preferably, the polymer is a thermoplastic polymer. Examples of suitable thermoplastic polymers include polyvinyl chloride, polyvinylidene chloride, polystyrene; styrene copolymers such as styrene and butadiene copolymer; and polycarbonates. Most preferably, polycarbonates are employed.

Many additives, such as coloring agents, plasticizers, antioxidants, stabilizers and desiccants, are known in the art to be useful in polymers. Additives which are inert with respect to the azo compound and are not contraindicated by the particular polymer and process employed may optionally be used in foamed compositions made by the instant process.

Azo compounds used as blowing agents in the instant process are those described above. A major amount of the polymeric composition is employed while an amount of the azo compound is employed sufficient to decrease the density of the polymeric composition under decomposition conditions. Such amount can vary and preferably ranges from about 0.01 to about 5 weight percent, more preferably from about 0.25 to about 0.35 weight percent.

Azo compounds used in this process are preferably dispersed evenly throughout the polymer composition to give a substantially uniform foaming effect. When the polymer is polycarbonate or a polycarbonate blend, the azo compounds are frequently highly soluble in the molten polymer. With other polymers, it may be advantageous to include a compatibilizing or stabilizing composition in the dispersion. Such composition can function to maintain the azo compound in a substantially dispersed uncoagulated form.

The azo compounds can be induced to decompose into nitrogen and organic compounds by heat. Other conditions, such as intense light, high sheer rate or exposure to ultrasound vibrations may accelerate the decomposition of some azo compounds at lower temperatures. Preferably, only heat is used to decompose the azo compound. The temperature at which the azo compound begins to decompose quickly must be a temperature at which the polymer composition is reasonably stable and in a liquid form. Preferably, the azo compound decomposes at between about 200° C. and about 350° C.; most preferably at between about 240° C. and about 315° C.

The forming apparatus may be any mold or device which can shape the foamed polymer into a shape suitable for its intended use or the next step in its processing. Such devices are well known in the art, as is their use.

An example of the preferred use of this process, not intended to limit either the specification or the claims, is in the injection molding of a thermoplastic polycarbonate or polycarbonate blend. The polymer is subjected to a temperature sufficient to melt it, preferably about 250° C. The blowing agent is added to the molten polymer and dispersed throughout the melt. The composition is subjected to a temperature sufficient to decompose the azo compound, preferably about 300° C. to about 310° C., under pressures such that the gases liberated by the decomposition can not substantially expand. Thereafter, the polymer composition is maintained under pressure until it is injected into a mold which is suitable to form it into its desired shape. When the polymer composition experiences reduced pressure in the mold, the liberated gas forms bubbles in the polymer, thereby foaming the polymer. The foamed polymer is permitted to cool in the mold until it is substantially hardened. Preferably, the cooling process takes not more than about one or two minutes.

Compositions Useful in the Practice of the Invention

An aspect of the instant invention is a composition of matter containing a thermoplastic polymer and an amount of an azo compound of this invention sufficient to foam a substantial amount of polymer. Such compositions are particularly useful in the practice of the instant invention when the composition contains a concentrated amount of blowing agent. A relatively small amount of the concentrate may be added to and dispersed throughout a larger amount of molten polymer which has no blowing agent, and the entire composition may be subjected to conditions which decompose the blowing agent. Such compositions are a convenient way to package, transport, market and use such a blowing agent in the process of this invention.

Polymers useful in the practice of this invention are any thermoplastic polymer which melts at a temperature at which the blowing agent is stable and which are relatively stable at the temperature at which the blowing agent decomposes. Preferably, the polymer melts at or below 250° C. More preferably, the polymer is stable up to about 315° C. Most preferably, the polymer is a polycarbonate or thermoplastic copolymer containing polycarbonate.

Polycarbonate polymers can be prepared by conventional methods. Suitable methods and compositions are disclosed for example in U.S. Pat. Nos. 4,066,611; 4,221,645; 4,330,662; 4,504,634 and 4,544,706. Further, the carbonate polymers useful in this invention can be aromatic carbonate polymers as described in U.S. Pat. Nos. 3,036,036; 3,036,037; 3,036,038 and 3,036,039; and polycarbonates of bis(aryl-hydroxyphenyl)alkylidenes (i.e., the bisphenol A type diols) including their aromatically and aliphatically substituted derivatives, such as those disclosed in U.S. Pat. Nos. 2,999,835; 3,038,365 and 3,334,154; and carbonate polymers derived from other aromatic diols such as described in U.S. Pat. No. 3,169,121. Polyester carbonate polymers are also suitably employed in this invention. Such polymers can be derived from at least two different dihydric phenols or a dihydric phenol and a glycol or a hydroxy- or acid-terminated polyester or a dibasic acid. Such mixtures can provide carbonate copolymer or interpolymer compositions. Suitable methods and combinations of such ester carbonate copolymers are described in U.S. Pat. Nos. 3,169,121; 4,287,787; 4,156,069; 4,260,731; 4,330,662; 4,360,656; 4,374,973; 4,225,556; 4,388,455; 4,355,150 and 4,105,633.

The blowing agents used in the composition comprise those azo compounds which are described as blowing agents hereinbefore. Preferably, the blowing agent makes up two to ten percent by weight of the composition. Most preferably, the blowing agent is about five percent of the composition.

Compositions of the instant invention may be made simply by heating the thermoplastic polymer to a temperature at which it is molten but the blowing agent is substantially stable. The blowing agent is then added to the polymer and dispersed by any known method throughout the polymer, until that dispersion is substantially even throughout the entire composition. Other necessary additives or components which are inert with respect to the blowing agent may also be added. The composition should then be cooled to solidifying temperatures within a short time to minimize incidental decomposition of the blowing agent. The composition may be pelletized or otherwise formed to a physical structure which can easily be measured, packaged and transported.

Foamed Polymeric Compositions

A third aspect of the instant invention is a foamed polymeric composition prepared by the process described above. Preferably the polymer is a thermoplastic polymer. Most preferably, the polymer is a polycarbonate or a polycarbonate copolymer. Polymers, blowing agents and the process needed to make those blown compositions are described above. Preferred reagent and process parameters are those set out above.

The foamed polymeric composition of this invention can have a density 1 to 50 percent lower than an unfoamed polymeric composition. Foamed polycarbonate compositions of this invention exhibit excellent strength and hardness. Foamed polycarbonate compositions of this invention also exhibit superior color qualities and show little discoloration.

ILLUSTRATIVE EXAMPLES

The following examples are illustrative only, and limit the scope of neither the claims nor the specification.

Example 1

A polycarbonate resin is prepared from bisphenol A and phosgene. Fifteen kilograms of the polycarbonate is dried, and 37.5 g (0.25 weight percent) of 2-ethyl-6-methyl-phenylazo-t-butane is added and mixed with the polycarbonate. The mixture is heated to 315° C. and injected into a 8.5-inch by 11-inch by 0.25-inch mold using a Cincinnati Milacron 200 ton injection molding machine. Two test bars of 5-inch by 0.5-inch by 0.25-inch are cut parallel to the polymer flow, and the density is 0.96 g/cc, and 0.92 g/cc. The impact strengths of the bars are 8.5 ft-lb/inch and 7.1 ft-lb/inch, respectively.

Examples 2-4

The procedure described above is repeated, employing the azo compounds named below as blowing agents, using an amount equal to 0.30% by weight of the composition to be foamed. A foamed polycarbonate resin with the density (in g/cc) and impact strength (in ft.-lbs./in) listed is obtained.

| Blowing Agent | Density | Impact Strength |
|---|---|---|
| 2,4,6-trimethylphenyl-azo-tert-butane | .98 | 8.4 |
| 2,6-dimethylphenyl-azo-tert-butane | .99 | 8.5 |
| o-isopropylphenyl-azo-tert-butane | .99 | 11.6 |

What is claimed is:

1. A composition of matter which contains a thermoplastic polymer and a blowing agent which comprises an azo compound with an aromatic moiety bridged to one or more aliphatic moiety by azo groups, said azo group being directly bound to the aromatic ring of an aromatic moiety and said aromatic and aliphatic moieties being chosen so that the decomposition temperature of the blowing agent is above the melting point of the polymer and at least 200° C., but below the decomposition temperature of the polymer.

2. A composition of claim 1 wherein the polymer is a polycarbonate or a thermoplastic polycarbonate blend with copolymers which is stable at the decomposition temperature of the blowing agent, and the blowing agent has the structure:

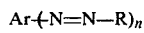

wherein Ar is an aromatic moiety and R is an aliphatic moiety and n is 1, 2 or 3.

3. A composition of claim 2 wherein n is 1 and Ar has the structure:

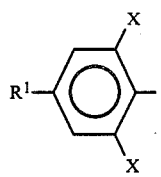

wherein each X and $R^1$ are independently hydrogen or a nonmetallic moiety with a formula weight of no less than 15.

4. A composition of claim 3 wherein R is a tertiary alkyl group and each X and $R^1$ are independently hydrogen or an alkyl group.

5. A composition of claim 4 wherein each X is independently hydrogen, methyl or ethyl.

6. A composition of claim 5 wherein R is a tertiary butyl, pentyl, hexyl, heptyl or octyl moiety.

7. A composition of claim 6 wherein the blowing agent is selected from the group consisting of phenylazo-tert-butane, 2,6-dimethylphenylazo-tert-butane, 2-methylphenylazo-tert-butane, or 2-ethyl-6-methylphenylazo-tert-butane.

8. A composition of claim 2 wherein the blowing agent makes up about 2 to 10 percent by weight of the composition.

9. A composition of claim 8 wherein the blowing agent makes up about 5 percent of the composition by weight.

10. A composition of claim 8 wherein the polymer is in a solid form.

* * * * *